United States Patent
Park et al.

(10) Patent No.: US 11,086,673 B2
(45) Date of Patent: Aug. 10, 2021

(54) ELECTRONIC DEVICE AND CONTROL METHOD THEREOF

(71) Applicant: SAMSUNG ELECTRONICS CO., LTD., Suwon-si (KR)

(72) Inventors: Daedong Park, Suwon-si (KR); Jaeseok Kang, Suwon-si (KR); Beomjin Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/794,400

(22) Filed: Feb. 19, 2020

(65) Prior Publication Data
US 2020/0264924 A1    Aug. 20, 2020

(30) Foreign Application Priority Data

Feb. 20, 2019  (KR) .................... 10-2019-0019847

(51) Int. Cl.
*G06F 9/46* (2006.01)
*G06F 9/48* (2006.01)

(52) U.S. Cl.
CPC .................... *G06F 9/4887* (2013.01)

(58) Field of Classification Search
CPC ................................................. G06F 9/4887
See application file for complete search history.

(56) References Cited

U.S. PATENT DOCUMENTS

| | | | |
|---|---|---|---|
| 6,370,656 B1 | 4/2002 | Olarig et al. | |
| 9,904,585 B1 | 2/2018 | Islam et al. | |
| 10,061,631 B2 | 8/2018 | Zhang et al. | |
| 10,084,678 B2 | 9/2018 | Brooks et al. | |
| 2005/0015766 A1 | 1/2005 | Nash et al. | |
| 2005/0268300 A1 | 12/2005 | Lamb et al. | |
| 2006/0200705 A1 | 9/2006 | Burger et al. | |
| 2012/0047513 A1 | 2/2012 | Lee et al. | |
| 2016/0132378 A1 | 5/2016 | Jung et al. | |

(Continued)

FOREIGN PATENT DOCUMENTS

| | | |
|---|---|---|
| KR | 10-1489674 B1 | 12/2014 |
| KR | 10-2018-0099463 A | 9/2018 |

OTHER PUBLICATIONS

Written Opinion (PCT/ISA/237) dated May 19, 2020, issued by the International Searching Authority in International Application No. PCT/KR2020/002011.

(Continued)

*Primary Examiner* — Gregory A Kessler
(74) *Attorney, Agent, or Firm* — Sughrue Mion, PLLC

(57) ABSTRACT

An electronic device may include a communication interface and a processor configured to receive scheduling information comprising a first task and a second task that are to be sequentially performed in a first electronic device from the first electronic device through the communication interface and monitor whether signals corresponding to each of the first task and the second task are received within a timeout time of each of the first task and the second task, which may be obtained based on the scheduling information, and the processor may further, based on receiving information on a third task after receiving first information corresponding to the first task from the first electronic device, renew a timeout time of the second task and monitor whether second information corresponding to the second task is received within the renewed timeout time.

19 Claims, 9 Drawing Sheets

(56) References Cited

U.S. PATENT DOCUMENTS

2017/0102968 A1 4/2017 Pont
2018/0010563 A1 1/2018 Ryon et al.

OTHER PUBLICATIONS

International Search Report (PCT/ISA/210) dated May 19, 2020, issued by International Searching Authority in International Application No. PCT/KR2020/002011.

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2019-0019847, filed on Feb. 20, 2019, in the Korean Intellectual Property Office, the disclosure of which is incorporated by reference herein in its entirety.

BACKGROUND

1. Field

The disclosure relates to an electronic device configured to monitor, in real-time, scheduling information and a control method thereof.

2. Description of Related Art

In safety-critical systems provided in, for example, vehicles, robots, or the like, a monitoring module to verify whether each of the modules performs tasks normally may be fundamentally needed.

The monitoring module may receive information (e.g., a monitoring signal) transmitted from a target module within a timeout time to determine whether the target module is being normally operated. However, if the timeout time is set to be a long time, the monitoring module may not quickly respond to an error of the target process (e.g., a process of the target module), and if the timeout time is set to be short, the possibility of the target process being determined (or identified) as an error may be high even though the target process is in a normal state (e.g., a normal operating state).

Accordingly, there is a need in the related art to flexibly set a timeout time based on real-time scheduling information according to the task performed in the target process.

However, monitoring modules in the related art merely monitor scheduled tasks and are unable to consider real-time scheduling variables. Accordingly, based on a specific module performing an unscheduled task whereby the specific module is not able to transmit monitoring information (e.g., signals) of scheduled tasks to the monitoring module, there have been problems, such as, the monitoring module misjudging that an error has occurred in the corresponding module.

SUMMARY

Provided are an electronic device for preventing an operation of unnecessarily resetting or rebooting a device (module) to be monitored that is in simple delay considering real-time scheduling and a control method thereof.

In accordance with an aspect of the disclosure, an electronic device may include a communication interface including circuitry; and a processor configured to obtain scheduling information comprising a first task and a second task that are to be sequentially performed in a first electronic device from the first electronic device through the communication interface, obtain, based on the scheduling information, a timeout time of the first task and a timeout time of the second task, and monitor whether first information corresponding to the first task and second information corresponding to the second task are obtained within the timeout time of the first task and the timeout time of the second task, respectively.

The processor may be further configured to, based on obtaining scheduling information on a third task after obtaining the first information corresponding to the first task from the first electronic device, renew the timeout time of the second task and monitor whether the second information corresponding to the second task is obtained within the renewed timeout time.

The processor may be further configured to renew the timeout time of the second task based on a priority level of the third task being higher than a priority level of the second task.

The processor may be further configured to identify a type of the third task based on the scheduling information on the third task, obtain a worst case execution time (WCET) of the third task based on the identified type, and extend the timeout time of the second task based on the WCET of the third task.

The extended timeout time of the second task may be obtained by adding the WCET of the second task to the WCET of the third task.

The processor may be the extended timeout time of the second task may be obtained by adding the timeout time of the second task to the WCET of the third task.

The processor may be further configured to obtain the scheduling information on the third task from a second electronic device, wherein the second electronic device is configured to obtain and process data obtained by the third task performed in the first electronic device.

The processor may be further configured to add a fourth task of the second other electronic device of obtaining and processing the data obtained by the third task based on the scheduling information on the third task being obtained, and wherein the fourth task processes the data obtained from the second electronic device.

The scheduling information on the third task may comprise at least one of information on a type of the third task or information on a priority level of the third task.

The electronic device may further comprise a watchdog module.

In accordance with an aspect of the disclosure, an electronic system may include a first electronic device and a second electronic device. The first electronic device may be configured to transmit scheduling information on an operation performed in the first electronic device to the second electronic device. The second electronic device may be configured to: obtain the scheduling information transmitted from the first electronic device, the scheduling information comprising a first task and a second task that are to be sequentially performed in the first electronic device, obtain, based on the scheduling information, a timeout time of the first task and a timeout time of the second task, and monitor whether first information corresponding to the first task and second information corresponding to the second task are obtained within the obtained timeout time of the first task and the obtained timeout time of the second task, respectively.

The second electronic device may be further configured to, based on obtaining scheduling information on a third task after obtaining the first information corresponding to the first task from the first electronic device, renew a timeout time of the second task and monitor whether the second information corresponding to the second task is obtained within the renewed timeout time.

According to an aspect of the disclosure, a control method of controlling an electronic device may include obtaining scheduling information comprising a first task and a second task that are to be sequentially performed in a first electronic device from the first electronic device; obtaining, based on the scheduling information, a timeout time of the first task and a timeout time of the second task; and monitoring whether first information corresponding to the first task and second information corresponding to the second task are obtained within the timeout time of the first task and the timeout time of the second task, respectively.

The monitoring may include, based on scheduling information on a third task being obtained after obtaining the first information corresponding to the first task from the first electronic device, renewing the timeout time of the second task and monitoring whether the second information corresponding to the second task is obtained within the renewed timeout time.

According to an aspect of the disclosure, a non-transitory computer readable medium includes computer instructions, which when executed by a processor of an electronic device, may cause the processor to: obtain scheduling information comprising a first task and a second task that are to be sequentially performed in a first electronic device from the first electronic device through the communication interface, obtain, based on the scheduling information, a timeout time of the first task and a timeout time of the second task, and monitor whether first information corresponding to the first task and second information corresponding to the second task are obtained within the timeout time of the first task and the timeout time of the second task, respectively.

The computer instruction may further cause the processor to, based on obtaining scheduling information on a third task after obtaining the first information corresponding to the first task from the first electronic device, renew the timeout time of the second task and monitor whether the second information corresponding to the second task is obtained within the renewed timeout time.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
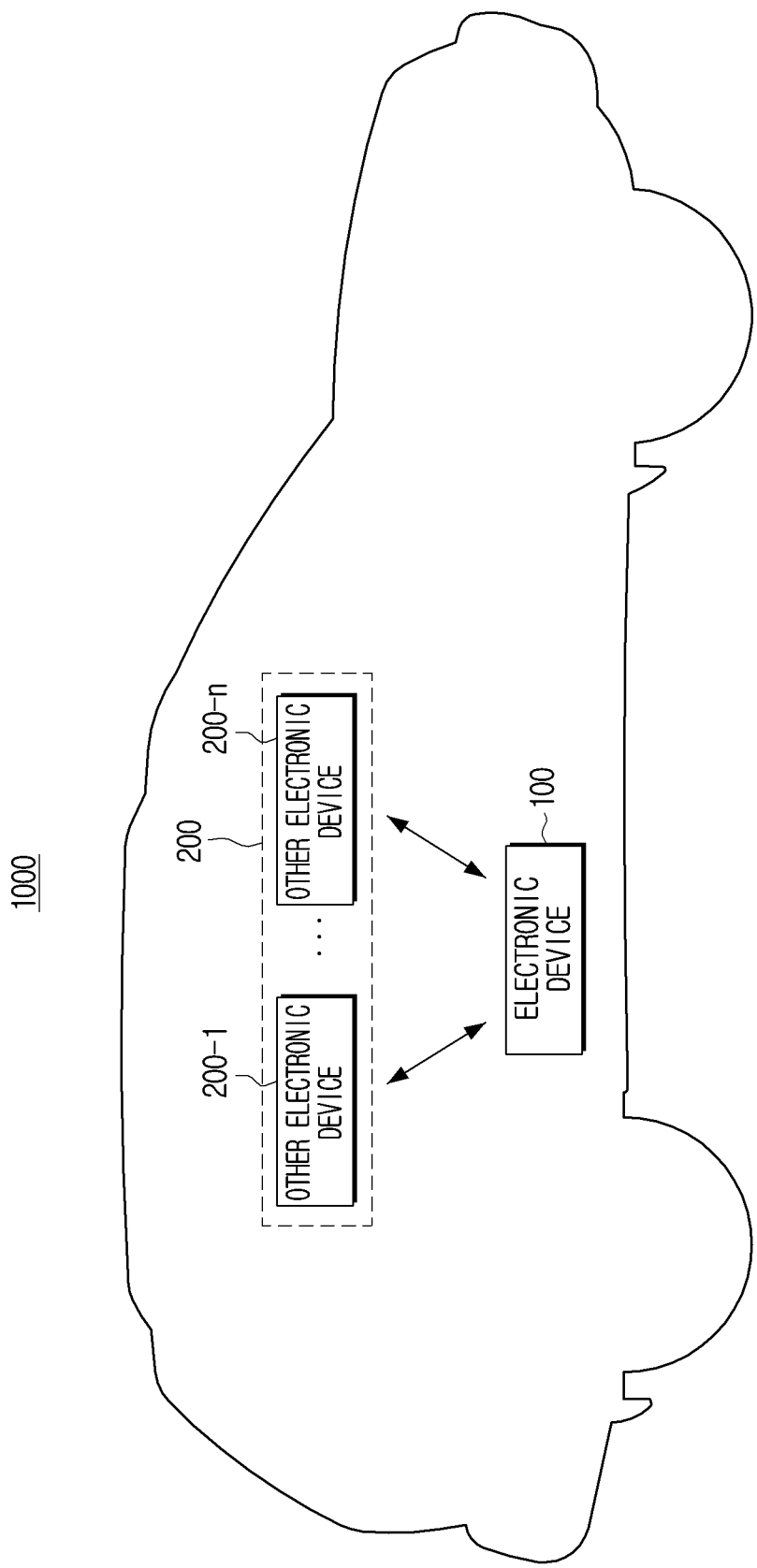
FIG. 1 is a diagram illustrating an electronic system according to an embodiment.

The disclosure will be explained in greater detail below with reference to the attached drawings.

The terms used in the disclosure will be briefly described, and the disclosure will be explained in detail.

The terms used in the disclosure have been selected from general terms currently widely used in consideration of the functions in the various embodiments of the disclosure, but may be changed according to the intention of those skilled in the related art or precedent, emergence of new technologies, and the like. The disclosure may use arbitrarily selected terms, and the meanings thereof will be disclosed in detail in the descriptions relevant to the disclosure. Accordingly, terms used in the disclosure are not simply understood by the term, but are defined based on the meaning of the term and the context throughout the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not intended to limit the scope of the disclosure to a specific embodiment, but should be interpreted to include all modifications, equivalents or alternatives of the embodiments included in the ideas and the technical scope of the disclosure as set forth herein. In case it is determined that in describing embodiments, detailed description of related known technologies may unnecessarily confuse the gist of the disclosure, the detailed description may be omitted.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The expression at least one from A and/or B is to be understood as indicating at least one of "A" or "B" or "A and B".

Expressions such as "first" or "second" used in the disclosure may be used to identify various elements regardless of order and/or importance, and may be used merely to differentiate one element from another but the relevant elements should not be limited thereto.

Based on an element (for example, first element) being indicated as being "coupled (operatively or communicatively) with/to" or "connected to" another element (for example, second element), it is to be understood that a certain element may be directly coupled to another element or may be coupled through another element (for example, third element).

The terms 'module' or 'part' used in the embodiments herein perform at least one function or operation, and may be implemented as a hardware or software, or a combination of hardware and software. Further, a plurality of "modules" or a plurality of "parts", except for a "module" or a "part" which needs to be implemented to a specific hardware, may be integrated to at least one module and implemented in at least one processor. In the disclosure, the term "user" may refer to a person using an electronic device or a device (example: electronic device with artificial intelligence) using an electronic device.

Embodiments will be described in detail with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description may be omitted, and like reference numerals may be used to indicate like elements.

FIG. 1 is a diagram illustrating an electronic system according to an embodiment.

An electronic system 1000 may include an electronic device 100 and another electronic device 200. The electronic system 100, as a system related to safety, may be a safety-critical system that may require strict restrictions on error generation. According to an embodiment, the electronic system 1000 may be a safety-critical system included in one or more of: vehicles, robots, or the like and may simultaneously be a real-time distributed system. Each of the electronic device 100 and the other electronic device 200 may be implemented as a module included in a system described above, but will be collectively designated as a device below for the convenience of description.

The electronic device 100 may be a device capable of monitoring the other electronic device 200, and specifically, a device capable of monitoring a signal transmitted from the other electronic device 200 and identifying whether an error of the other electronic device 200 may have been generated based on the monitored signal transmitted from the other electronic device 200. The electronic device 100 may be implemented as a device including a module performing a watchdog function, and in addition thereto as various forms of devices capable of monitoring the other electronic device 200.

The other electronic device 200 may refer to a process device performing a task that is a target of scheduling and may be a device that is a target to monitor. For example, in the case of a vehicle, the other electronic device 200 may be implemented as an electronic control unit (ECU). The other electronic device 200 may be a plurality of other electronic devices 200-1 to 200-n, and may transmit a predetermined signal (e.g., a monitoring signal) to the electronic device 100 to signal that the scheduled task is currently in progress or has been completed.

The electronic device 100 may, based on the monitoring signal not being received from the other electronic device 200 within a predetermined timeout time, may identify an error being generated in the other electronic device 200 and may reset or reboot the other electronic device 200 to operate normally. The timeout time may refer to a time range in which the electronic device 100 is in a standby mode to receive a predetermined signal from the other electronic device 200.

However, even when an unscheduled urgent task is added to the other electronic device 200 and thus the scheduled task is not performed, the monitoring signal for the scheduled task is not transmitted to the electronic device 100, which can be identified as an error having occurred in the other electronic device 200. In this case, the other electronic device 200 may not perform the scheduled task while being reset or rebooted, and in the case of autonomous vehicle driving technology, problems such as a vehicle not being able to perform a particular task (e.g., the task of sudden braking or the task of obstacle avoidance movement) while the engine management ECU (other electronic device) is being reset or rebooted may arise.

Accordingly, in the disclosure, based on the other electronic device 200 performing an unscheduled task and not normally transmitting the monitoring signal to the electronic device 100 within the timeout time, the timeout time for receiving the monitoring signal may be extended, which is described in greater detail in the various embodiments. FIG. 1 illustrates a diagram of a vehicle to show a safety-critical system included in the vehicle, but the embodiment is merely one example, and the safety-critical system may be applied to various devices applied with a real-time distributed system such as a robot, or the like.

Figure 2:
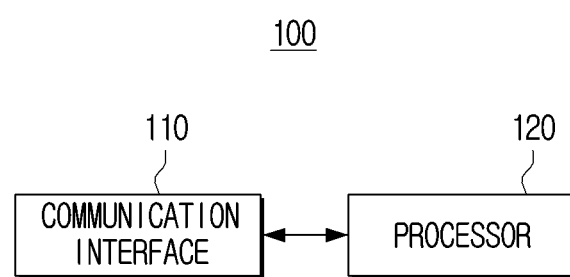
FIG. 2 is a block diagram for describing an operation of an electronic device according to an embodiment.

FIG. 2 illustrates a block diagram for describing an operation of an electronic device according to an embodiment.

Referring to FIG. 2, the electronic device 100 may include a communication interface 110 and a processor 120.

The communication interface 110 may be configured to transmit data to and receive data from the other electronic device 200. The communication interface 110 may include circuitry (hardware).

For example, the communication interface 110 may be configured to receive data from the other electronic device 200 according to a wired/wireless communication method. The communication interface 110 may use communication methods such as, for example, and without limitation, one or more of: Bluetooth (BT), wireless fidelity (Wi-Fi), Zigbee, infrared (IR), serial interface, universal serial bus (USB), near field communication (NFC), vehicle to everything (V2X), or mobile communication (Cellular).

Specifically, the communication interface 110 may receive information, such as, status information (e.g., signals) corresponding to scheduling information and information regarding each task included in the scheduling information from the other electronic device 200. The information corresponding to the task refers to the information indicating that the task is currently in progress or has been completed, and may be a monitoring signal indicating that the corresponding task has been normally performed. In addition, the communication interface 110 may receive scheduling information on the task performed in the other electronic device 200 from the external server.

The processor 120 may control the overall operation of the electronic device 100.

According to an embodiment, the processor 120 may be implemented as one or more of: a digital signal processor (DSP), a microprocessor, a time controller (TCON) that processes digital signals, or the like. However, the processor is not limited thereto, and may include, for example, and without limitation, one or more of a central processing unit (CPU), a micro controller unit (MCU), a micro processing unit (MPU), a controller, an application processor (AP), a communication processor (CP), an ARM processor, or the like. Further, the processor 120 may be implemented as System on Chip (SoC) or large scale integration (LSI) embedded with a processing algorithm, and may be implemented in the form of field programmable gate array (FPGA). The processor 120 may perform various functions by executing computer executable instructions stored in a memory.

The other electronic device 200 may be an external device. The other electronic device 200 may indicate a first other electronic device 200-1 and a second other electronic device 200-2. The other electronic device 200 may indicate a first external device and a second external device below.

According to an embodiment, the processor 120 may receive scheduling information including a first task and a second task sequentially performed in the external device from the external device 200 through the communication interface 110. The task may be performed in a thread unit. Specifically, the processor 120 may receive scheduling information from the scheduler of the external device 200, but may also receive scheduling information on the task performed in the external device 200 from the external server. In addition, the processor 120 may obtain scheduling information by accessing the scheduler of the external device 200.

The processor 120 may, based on the timeout time of each of the first task and the second task obtained based on the scheduling information, monitor whether signals corresponding to each of the first task and the second task is received. The scheduling information may include at least one of a type of each task, a timeout time of each task or a priority level of each task. In addition, the status information (e.g., a signal) corresponding to the task may be predetermined information (e.g., a predetermined signal) that indicates whether the task is normally in progress or has been completed. Further, the timeout time may refer to a time range in which the electronic device 100 is in a standby mode to receive predetermined information (e.g., a predetermined signal (monitoring signal)) from the other electronic device 200. For example, based on the timeout time being 100 ms, the processor 120 may identify whether the predetermined information (e.g., predetermined signal) is received from the external device 200 within 100 ms. Based on the predetermined information not being obtained from the external device within the timeout time, the processor 120 may reset or reboot the other device 200. The processor may determine that an error is generated in the other device 200 based on the predetermined signal not being received in the electronic device 100 within the timeout time.

The processor 120 may, based on the timeout time of each of the first task and the second task being included in the scheduling information, directly obtain the timeout time for each of the first task and the second task, but may predict the timeout time from information on a type of each of the first task and the second task based on the timeout time not being included in the scheduling information. For example, the timeout time of each task may be obtained based on worst case execution time (WCET) information, which will be described in greater detail below. The timeout time of each of the first task and the second task may be the same or different according to the type of each of the first task and the second task.

The processor 120 may, based on information (e.g., status information) of a third task being received after a first signal corresponding to the first task is received from the other device, renew the timeout time of the second task. That is, based on the third task being performed while the second task, which is scheduled after the first task, is not performed, the processor 120 may extend the timeout time of the second task without determining that an error has been generated in the other electronic device 200.

The information on the third task may include at least one of information on a type of the third task or information on the priority level of the third task, and may be information not included in the scheduling information received from the other device 200. That is, the third task may be an unscheduled newly added task. For example, the other electronic device 200 may be implemented as an engine management ECU of a vehicle. The first task and the second task may be tasks checking the engine temperature. However, based on an obstacle appearing suddenly in the front of the vehicle, an unscheduled task of avoidance movement (third task) may be added to the other electronic device 200.

The information of the third task may be received from the other electronic device 200-1 or the other external device 200-2, which will be described in greater detail below.

In the above described description, it is described that information on the third task may be received from the other electronic device 200-1 or the other electronic device 200-2, but the processor 120 may access the memory of the other electronic device 200-1 or the other electronic device 200-2 and obtain real-time scheduling information added to the third task. Based on an unscheduled third task being added, the other electronic device 200-1 or the other electronic device 200-2 may add the real-time scheduling information added with the third task to each memory. Accordingly, the processor 120 may periodically access the memory of the other electronic device 200-1 or the other electronic device 200-2.

The information of the third task may be information (e.g., a signal) corresponding to the third task. That is, the information on the third task may be predetermined information (e.g., a predetermined signal) to indicate whether the third task is normally in progress or has been completed.

As described above, based on information on the third task being received according to the various embodiments, the processor 120 may need to identify whether the scheduled second task is delayed and that the third task is to be performed prior to the second task. Accordingly, the processor 120 may compare the priority level of the second task with the priority level of the third task.

The processor 120 may renew a timeout time of the second task based on the priority level of the third task being higher than the priority level of the second task. For example, based on an unscheduled third task being added but performed after the second task, that is, based on the priority level of the third task being lower than the priority level of the second task, the processor 120 may not renew the timeout time of the second task. The newly added third task may not affect the timeout time of the second task.

The priority level may be determined from at least one of information on the other electronic device 200, the external sever, or the predetermined priority level.

The processor 120 may then monitor whether information (e.g., a signal) corresponding to the second task is received within the renewed timeout time.

For example, the electronic device being implemented as an engine management electronic control unit (ECU) of a vehicle, checking the engine temperature of the vehicle at 100 ms intervals and transmitting information (e.g., a signal (predetermined signal)) corresponding to the task of checking the engine temperature to the electronic device 100 may be assumed. The timeout time of the task of checking engine temperature may be 100 ms. Based on discovering an unexpected obstacle in the front of the vehicle, the engine management ECU (external device) may suspend the task of checking engine temperature (second task) and perform a task of avoidance movement of the vehicle (third operation). In this case, the engine management ECU (external device) may not transmit information (e.g., a signal (predetermined signal)) corresponding to the task of checking engine temperature to the electronic device 100 based on processing the task of avoidance movement. However, the processor 120 may receive information on the task of avoidance movement (third task) from the engine management ECU, and thus identify having performed the task of avoidance movement rather than error generating in the engine management ECU. Accordingly, the processor 120 may extend the timeout time of the task of checking engine temperature (second task) by the timeout time of the task of avoidance movement (third task). Based on the monitoring signal on checking the engine temperature not being received within 100 ms, the processor 120 may not determine an error being generated in the engine management ECU and thus, the engine management ECU may normally perform the task of avoidance movement and then perform the task of checking engine temperature. Based on the timeout time of the task of checking engine temperature (second operation) not being extended, the task of avoidance movement being performed in the engine management ECU (external device) may be suspended based on the information (e.g., signal) corresponding to checking the engine temperature within 100 ms not being transmitted to the electronic device 100 and the processor 120 resetting or rebooting the engine management ECU, and thereby leading to accidents. Accordingly, according to an embodiment, the timeout time of the second task may be renewed, the third task that requires urgent processing may be normally performed, and the second task may also be normally performed thereafter.

The processor 120 may identify a type of the third task based on information on the third task, and obtain the WCET of the third task based on the identified type. Specifically, the processor 120 may estimate the time the second task is delayed by the third task based on the WCET information according to the type of the task. For example, the other electronic device 200, which may be an external device 200 being implemented as a camera sensor, and the third task calculating the distance with the object included in the photographed image may be assumed. The processor 120 may estimate the time required to perform the task of calculating the distance from the WCET information. The WCET information refers to the maximum time required to perform the relevant task, and the timeout time indicates the maximum time required to complete the relevant task without fail. For example, if the task of calculating the distance can be performed by taking 50 ms or 100 ms, the WCET of the task calculating the distance is 100 ms. Accordingly, the processor 120 may obtain the WCET of the task calculating the distance (third task) from the WCET information as 100 ms.

The processor 120 may, based on the WCET of the third task, extend the timeout time of the second task. The extended timeout time of the second task may be obtained by adding the WCET of the second task and the WCET of the third task.

For example, based the WCET of the task for obtaining an image (second task) being 20 ms, the priority level of the task of calculating the distance with the object included in the image being higher than the second task, and the WCET of the task of calculating the distance with the object included in the image being 100 ms, the processor 120 may extend the timeout time of the second task to 120 (20+100) ms.

The processor 120 may receive information on the third task from the other electronic device 200-1 or from the other electronic device 200-2. Based on the other electronic device 200-2 being related to the other electronic device 200-1, the other electronic device 200-2 may transmit information on the third task to the electronic device 100. Specifically, the other electronic device 200-2 may be a device that receives and processes data obtained by the third task performed in the other electronic device 200-1 from the other electronic device 200-1.

For example, the other electronic device 200-01 may be an external device that is a camera sensor, and the other electronic device 200-2 may be a device that processes an image to perform at least one of object detection, scene segmentation, and the like. Information on the third task of obtaining an image may be received from not only the other electronic device 200-1 but also from the other electronic device 200-2. The other electronic device 200-2 may be a device that processes the obtained image (raw data) from the other electronic device 200-1 based on recognizing that the third task is performed in the other electronic device 200-1.

The processor 120 may, based on information on the third task being received, add a fourth task of the other electronic device that receives and processes data obtained by the third task to the scheduling information of the other electronic device. For example, based on information on the task of obtaining an image (third task) being received, the fourth task of image processing such as object detection and scene segmentation being performed in the other electronic device may be predicted, and the processor 120 may add a fourth task to the scheduling information on the other electronic device in which the fourth task is performed. That is, the processor 120 may, based on the third task being received, add not only the third task but also the fourth task related to the third task to the scheduling information. The fourth task may be a task processing received data from the other electronic device.

In the description above, the second task is described as being indicated as to be sequentially performed after the first task in the other electronic device 200, but the first task and the second task may be concurrently performed and the performance of the scheduled task thereafter by the newly added third task may be delayed.

In addition, in the description above, the performing of the second task scheduled after the first task is described as being delayed but the scheduled first task may also be delayed by the newly added third task and the third task may be performed prior to the first task and the second task.

The processor 120 may receive information on the third task prior to the timeout time of the second task passing and renew the timeout time of the second task, but based on the timeout time of the second task having passed, the processor 120 may obtain information on the third task by accessing the memory of the other electronic device 200-1 or the memory of the other electronic device 200-2.

The electronic device 100 may be implemented as a device including a module that performs a watchdog function. The watchdog may be a module that checks whether a information (e.g., a signal) transmitted periodically from the other electronic device 200 is received to identify an error generated in the other electronic device and may be designated as a watchdog module, a watchdog timer, a watchdog circuitry, a watchdog machine, and the like. However, the module performing the watchdog function in the disclosure will be collectively designated as a watchdog module for convenience of description.

According to the embodiment, an unnecessary operation of resetting or rebooting the other electronic device 200 in which no error is generated may be prevented.

Figure 3:
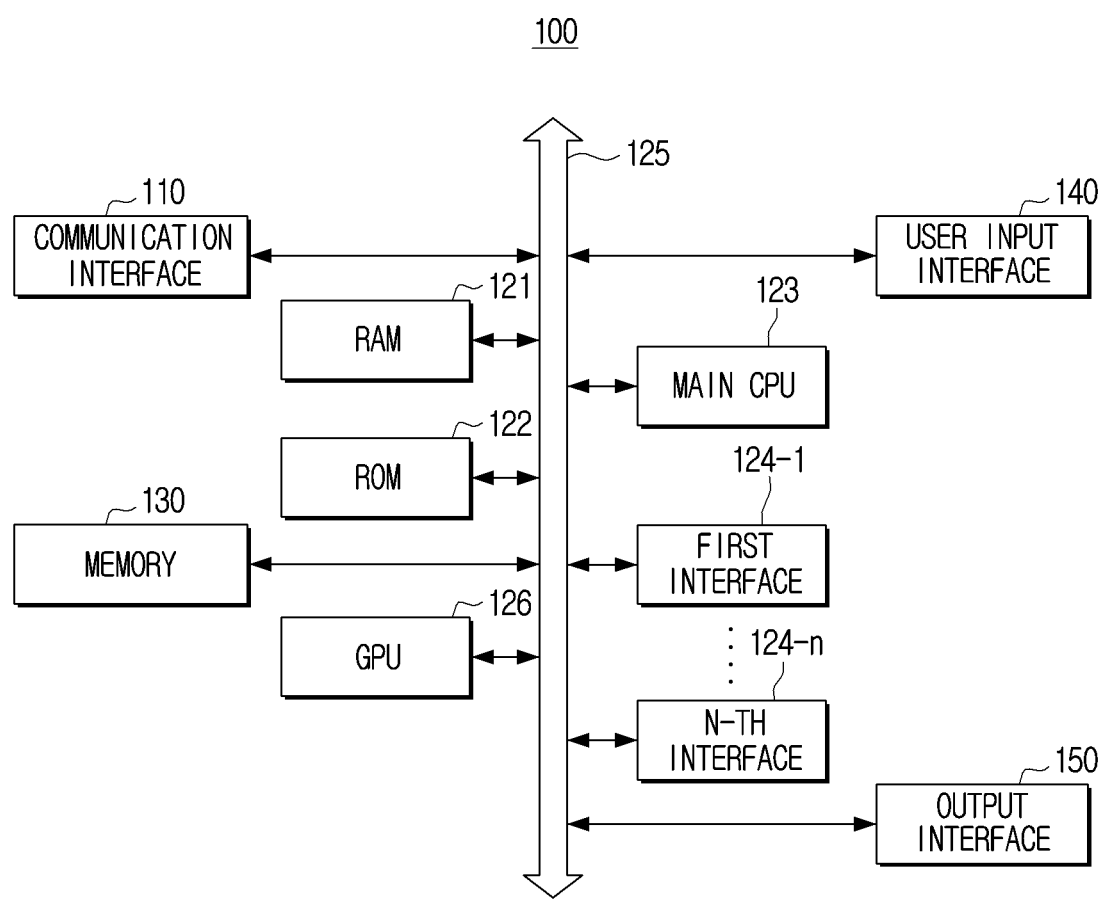
FIG. 3 is a block diagram for describing a specific configuration of an electronic device.

FIG. 3 is a block diagram for describing a specific configuration of an electronic device.

Referring to FIG. 3, the electronic device 100 may include a communication interface 110, a processor 120, a memory 130, a user input interface 140, and an output interface 150. A detailed description on the parts overlapping with the configuration illustrated in FIG. 2 from the configuration illustrated in FIG. 3 will be omitted.

The communication interface 110 may be configured to transmit and receive data with the external device 200 or other external devices. The communication interface 110 may include an Ethernet module, a controller area network (CAN), a FlexRay module, an Ethernet for control automation technology (EtherCAT) module, USB, a mobile industry processor interface camera serial interface (MIPI CSI), a wireless communication module, or the like. Each communication module may be implemented in at least one hardware chip form. The wireless communication module, other than the communication methods described above, may include at least one communication chip performing communication according to the size of the various wireless communication modules such as Zigbee, WI-FI module, Bluetooth module, 3rd generation (3G), 3rd generation partnership project (3GPP), long term evolution (LTE), LTE Advanced (LTE-A), 4th generation (4G), 5th generation (5G) or the like. However, the above is merely an embodiment, and based on the communication interface 110 communicating with the external device 200, may use at least one communication module from the various communication modules.

The processor 120 may use the various programs stored in the memory 130 to control the overall operation of the electronic device 100.

Specifically, the processor 120 may include a random access memory (RAM) 121, a read only memory (ROM) 122, a main CPU 123, a first to n-th interface 124-1 to 124-n, and a bus 125.

The RAM 121, the ROM 122, the main CPU 123, the first to n-th interface 124-1 to 124-n, and the like may be interconnected through the bus 125.

An instruction set and the like for system booting may be stored in the ROM 122. Based on a turn-on instruction being input and power being supplied, the main CPU 123 may copy the O/S stored in the memory 130 to the RAM 121 according to the instructions stored in the ROM 122, and execute the O/S to boot the system. Based on completing the booting, the main CPU 123 may copy the various application programs stored in the memory 130 to the RAM 121, and execute the application programs copied to the RAM 121 to perform various operations. The aforementioned RAM 121 and the ROM 122 may be implemented as an external memory separate from the processor 120.

The main CPU 123 may access the memory 130 and perform booting using the O/S stored in the memory 130. Further, various programs, content data, and the like stored in the memory 130 may be used to perform various operations.

The first to n-th interface 124-1 to 124-n may be connected to the various elements described above. At least one of the interfaces may be a network interface connecting to an external device through the network.

The graphics processing unit (GPU) 126 may correspond to a high-performance processing device for graphics processing. In addition, the GPU 126 may refer to a visual processing unit (VPU).

In FIG. 3, both the main CPU 123 and the GPU 126 have been indicated, but the processor 120 may be operated by implementing at least one of the main CPU 123 or the GPU 126 in actual implementation.

The memory 130 may be implemented as a memory separate from the processor 120. In this case, the memory 130 may be implemented as an embedded memory form to the electronic device 100 or as a detachable memory form to the electronic device 100. For example, data for the driving of the electronic device 100 may be stored in an embedded memory to the electronic device 100, and data for the expansion function of the electronic device 100 may be stored in a detachable memory to the electronic device 100. The embedded memory to the electronic device may be implemented as, for example, and without limitation, at least one of a volatile memory (example: dynamic RAM (DRAM), static RAM (SRAM) or synchronous dynamic RAM (SDRAM), etc.)), a non-volatile memory (example: one time programmable ROM (OTPROM), programmable ROM (PROM), erasable and programmable ROM (EPROM), electrically erasable and programmable ROM (EEPROM), mask ROM, flash ROM, flash memory (example: NAND flash or NOR flash, etc.)), a hard drive, or a solid state drive (SSD)), and the detachable memory to the electronic device 100 may be implemented as, for example, and without limitation, a memory card (for example, compact flash (CF), secure digital (SD), micro secure digital (Micro-SD), mini secure digital (Mini-SD), extreme digital (xD), multi-media card (MMC), etc.), an external memory capable of connecting to a USB port (for example, a USB memory), or the like.

In addition, the memory 130 may be implemented as an internal memory of a ROM (for example, an EEPROM), a RAM, or the like included in the processor 120.

The memory 130 may store the scheduling information obtained from the other electronic device 200. In addition, the memory 130 may store information on the third task, that is, at least one of information of a type of the third task or information on priority level of the third task. Further, the memory 130 may store scheduling information received from not only the other electronic device 200 but also from other external devices (e.g., 200-1, 200-2 . . . 200-n).

In addition, the memory 130 may store the WCET information according to the type of the tasks.

The user input interface 140 may be configured to obtain input information based on various user input or instruction. The processor 120 may execute a function corresponding to the user input or instruction through the user input interface 140 or store the information input through the user input interface 140 in the memory 130.

For example, the processor 120 may receive input information regarding the priority level for each task from the user through the user input interface 140 and store the received input information in the memory 130.

The user input interface 140 may include a microphone to receive user input (e.g., an instruction) in voice format or may be implemented as a display of the output interface 150, such as, as a touchscreen that receives input of a user instruction in touch format.

In addition, the user input interface 140 may receive input of signals included with information on a user instruction or task from a separate control device to control the electronic device 100.

The output interface 150 may include one or more of: a display, a voice output interface, and the like.

The output interface 150 may output a monitoring status of the external device 200 through a display, a voice output interface or the like based on a control of the processor 120. For example, the output interface 150 may notify that an error may be generated in a camera device (external device) through the display, the voice output interface, or the like.

Figure 4A:
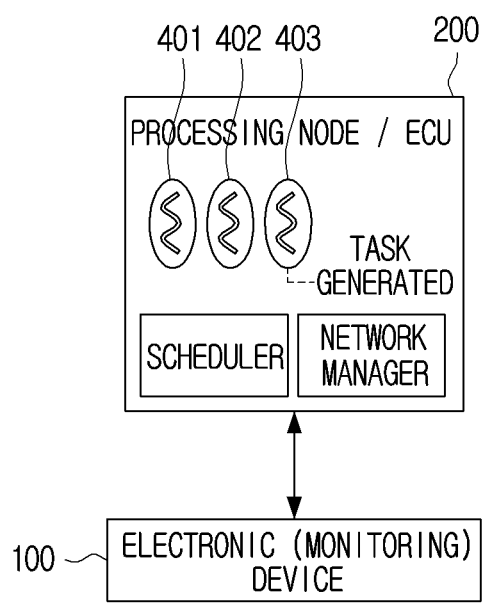
FIG. 4A is a diagram for describing an operation performed in an electronic device and a single other electronic device according to an embodiment.

FIG. 4A is a diagram for describing an operation performed in an electronic device 100, which may be a monitoring device, and a single other electronic device 200 according to an embodiment.

According to an embodiment, the first task 401 and the second task 402, in FIG. 4A, are scheduled tasks and the third task 403 is a newly added task. In addition, the electronic device 100 may be implemented as a monitoring device, and the other electronic device may be implemented as a scheduling device, such as, being implemented as the Electronic Control Unit (ECU) of a vehicle. As shown in FIG. 4A, the other electronic device 200 may include a communication interface, such as, a network communication interface. The electronic device may include a network manager that manages communication that is performed using the communication interface.

The electronic monitoring device 100 may receive scheduling information of the other electronic device 200 from the scheduler of the other electronic device 200. In addition, the electronic monitoring device 100 may obtain scheduling information by accessing the scheduler of the other electronic device 200.

Based on an unscheduled third task being newly generated in the other electronic device 200, the other electronic device 200 may transfer (e.g., transmit) information of the third task to the electronic monitoring device 100. The information on the third task may include at least one of information on a type of the third task or information on a priority level of the third task, and may be information not included in the scheduling information received from the other electronic device 200 by the electronic monitoring device 100.

The electronic monitoring device 100 may, based on obtaining information on the third task, compare the priority level of the third task 403 with the second task 402, which may be currently in progress. Based on the priority level of the third task 403 being higher than a priority level of the second task 402, the timeout time of the second task 402 required after the first task 401 is performed may be extended based on having to perform the third task 403 prior to the second task 402. For example, the second task 402 may be a task of measuring the engine temperature of a vehicle, the timeout time may be 10 ms, the newly added third task 403 may be a task of avoidance movement, and the task of avoidance movement may have a priority level higher that is higher than a priority level of the task of measuring the engine temperature. In this case, the electronic monitoring device 100 may obtain the WCET at 5 ms. Accordingly, the electronic device 100 may extend the timeout time for receiving predetermined information (e.g., a predetermined signal) on the second task 402 after the first task 401 is completed. Specifically, the extended timeout time of the second task 402 may be calculated by adding the WCET of the third task 403 to the previous timeout time of the second task 402. For example, 10 ms (second task) and 5 ms (third task) may be added together to calculate the timeout time of the second task 402 (15 ms), and hence the timeout time may be extended by 15 ms. Accordingly, the electronic monitoring device 100 may identify whether predetermined information (e.g., a predetermined signal) on the second task 402 is received during the extended timeout time (e.g., 15 ms) after the first task 401 is completed.

Figure 4B:
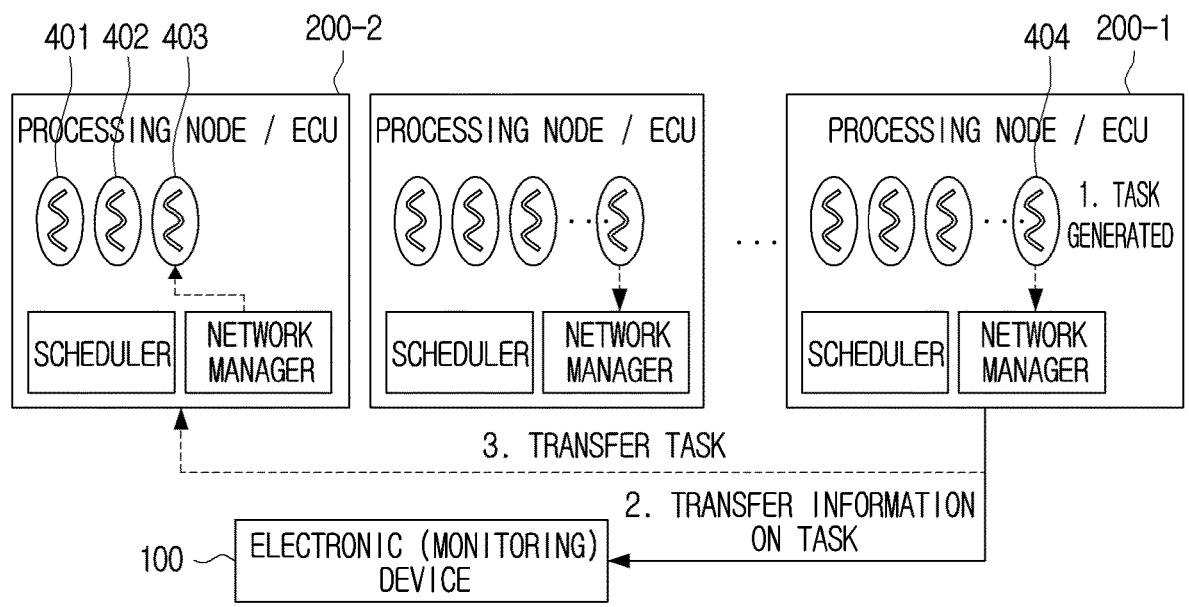
FIG. 4B is a diagram for describing an operation performed in an electronic device and a plurality of other electronic devices according to an embodiment.

FIG. 4B is a diagram for describing an operation performed in an electronic device 100, which may be a monitoring device, and a plurality of other electronic devices 200 according to an embodiment.

According to an embodiment, as shown in FIG. 4B, the first task 401 and the second task 402 may be scheduled tasks, and the third task 403 may be a newly added task. However, unlike in FIG. 4A, the third task 403 in FIG. 4B may be a task generated by the task 404 of the first device 200-1. Each of the other electronic devices may be designated as a first device 200-1, a second device 200-2, and the like for the convenience of description.

The electronic monitoring device 100 may receive scheduling information of each of the other electronic devices from the scheduler of each of the other electronic devices 200-1 to 200-n. In addition, the electronic monitoring device 100 may obtain the scheduling information by accessing the scheduler of each of the other electronic devices 200-1 to 200-n.

For example, a task of identifying that an obstacle is suddenly generated in the front of the vehicle and calculating the distance to the obstacle may be performed in the first device 200-1, which may be a vision processing ECU. In this case, the first device 200-1 may transfer information on the task 404 of calculating the distance to the suddenly generated obstacle to the electronic monitoring device 100 and may transfer the result of the performed task 404 to the second other electronic device 200-2.

The electronic monitoring device 100 may, based on the task 404, calculate the distance to the obstacle using a communication table, and predict that the task of avoidance movement may be performed in the second other electronic device 200-2. The communication table may include information on a related task, and may be related to tasks such as the task of avoidance movement based on the task of calculating the distance to the obstacle having been performed, and the task of detecting an object from the image based on the task of image photographing being performed in a field related to vehicles.

That is, the electronic monitoring device 100 may obtain information on the third task based on information on the task 404 received from the first other electronic device 200-1. In addition, the electronic monitoring device 100 may receive information on the third task from the second other electronic device 200-2. The information on the third task may include at least one of information on a type of the third task or information on a priority level of the third task, and may be information not be included in the scheduling information received from the first other electronic device 200-1 by the electronic monitoring device 100. The electronic monitoring device 100 may add the third task to the scheduling information on the second device 200-2.

The electronic monitoring device 100 may compare the priority level of the third task 403 with a priority level of the second task 402, which may currently be in progress. Based on the priority level of the third task 403 being higher than the priority level of the second task 402, the timeout time of the second task 402, which may be needed (or required) after the first task 401 is performed, may be extended based on having to perform the third task 403 prior to the second task 402. For example, the second task 402 may be a task for measuring the engine temperature of a vehicle, the timeout time may be 10 ms, the newly added third task 403 may be a task of avoidance movement, and the task of avoidance movement may have a higher priority level compared to a priority level of the task of measuring engine temperature. In this case, the electronic monitoring device 100 may obtain the WCET at 5 ms. Accordingly, the electronic monitoring device 100 may extend the timeout time to receive predetermined information (e.g., a predetermined signal) on the second task 402 after the first task 401 is completed. Specifically, the extended timeout time of the second task 402 may be calculated by adding the WCET of the third task 403 to the previous timeout time of the second task 402. For example, a timeout time of the second task 402 may be extended by 15 ms by adding 10 ms (previous/original timeout time of the second task) and 5 ms (WCET of the third task). Accordingly, the electronic monitoring device 100 may identify whether predetermined information (e.g., a predetermined signal) on the second task 402 is received during the 15 ms after the first task 401 is completed. That is, the electronic device 100 may obtain information on the third task based on information on a task transferred between the other electronic devices.

Figure 4C:
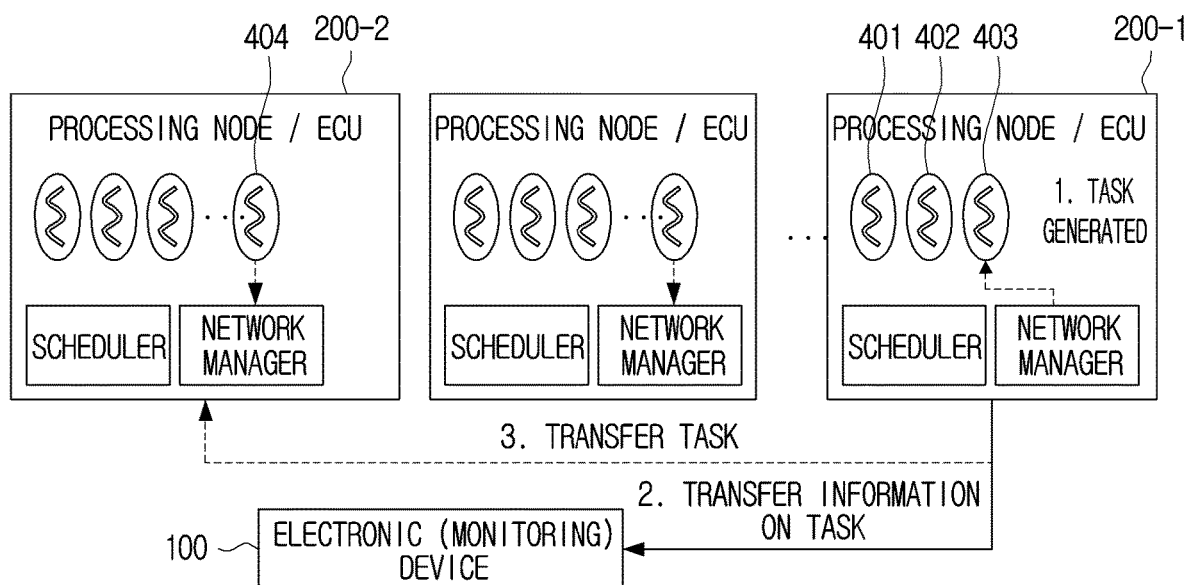
FIG. 4C is a diagram for describing an operation performed in an electronic device and a plurality of other electronic devices according to another embodiment.

FIG. 4C is a diagram for describing an operation performed in an electronic device 100, which may be a monitoring device, and a plurality of other electronic devices 200 according to another embodiment.

According to an embodiment, as shown in FIG. 4C, the first task 401 and the second task 402 may be scheduled tasks, and the third task 403 may be a newly added task. However, unlike in FIG. 4B, the third task 403 in FIG. 4C may be a task generated in the first other electronic device 200-1 and a fourth task 404 of the second electronic device 200-2 may be generated by the generation of the third task 403.

For example, an unscheduled task of obtaining an image (third task) 403 may be generated and the first other electronic device 200-1 may perform the task of obtaining an image 403 prior to the second task 402. In this case, the first device 200-1 may transfer information on the task for obtaining the image 403 to the electronic monitoring device 100 and may transfer the obtained image, which is the result of the task of obtaining the image 403, to the second other electronic device 200-2.

The electronic monitoring device 100 may predict that the task of object detection (fourth task) 404 may be performed based on the image in the second other electronic device 200-2 if the task of obtaining an image 403 is performed based on the communication table.

Accordingly, the electronic monitoring device 100 may add to the scheduling information on the second device 200-2, in which the task of object detection 404 is performed.

That is, the electronic device 100 may add not only the third task 403 but also a fourth task 404 related to the third task 403 to the scheduling information on the second device 200-2 based on information on the third task 403 being received.

Figure 5:
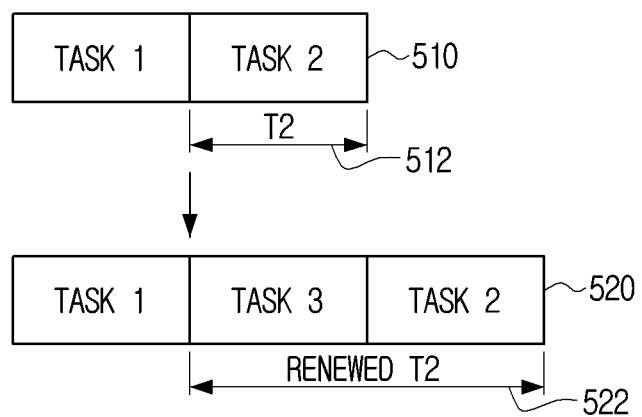
FIG. 5 is a diagram for describing a third task having a higher priority level than a second task according to an embodiment.

FIG. 5 is a diagram for describing a third task having a higher priority level than a priority level of a second task according to an embodiment.

Reference numeral 510 in FIG. 5 illustrates a diagram showing a task processing order of a Task 1 and a Task 2 in the scheduling information included in the first task (Task 1) and the second task (Task 2) received from the other electronic device 200

Reference numeral 512 indicates the timeout time T2 of Task 2.

Reference numeral 520 in FIG. 5 illustrates a diagram showing the task processing order of Task 1, Task 2 and Task 3 based on a third task (Task 3) being newly generated and the Task 3 having a higher priority level than a priority level of the Task 2.

The renewed T2 (reference numeral 522) may indicate the timeout time of the Task 2 after the Task 3 is generated. The renewed time out time T2 (reference numeral 522) may be obtained, for example, by adding the WCET of Task 3 to the previous T2 512.

Figure 6:
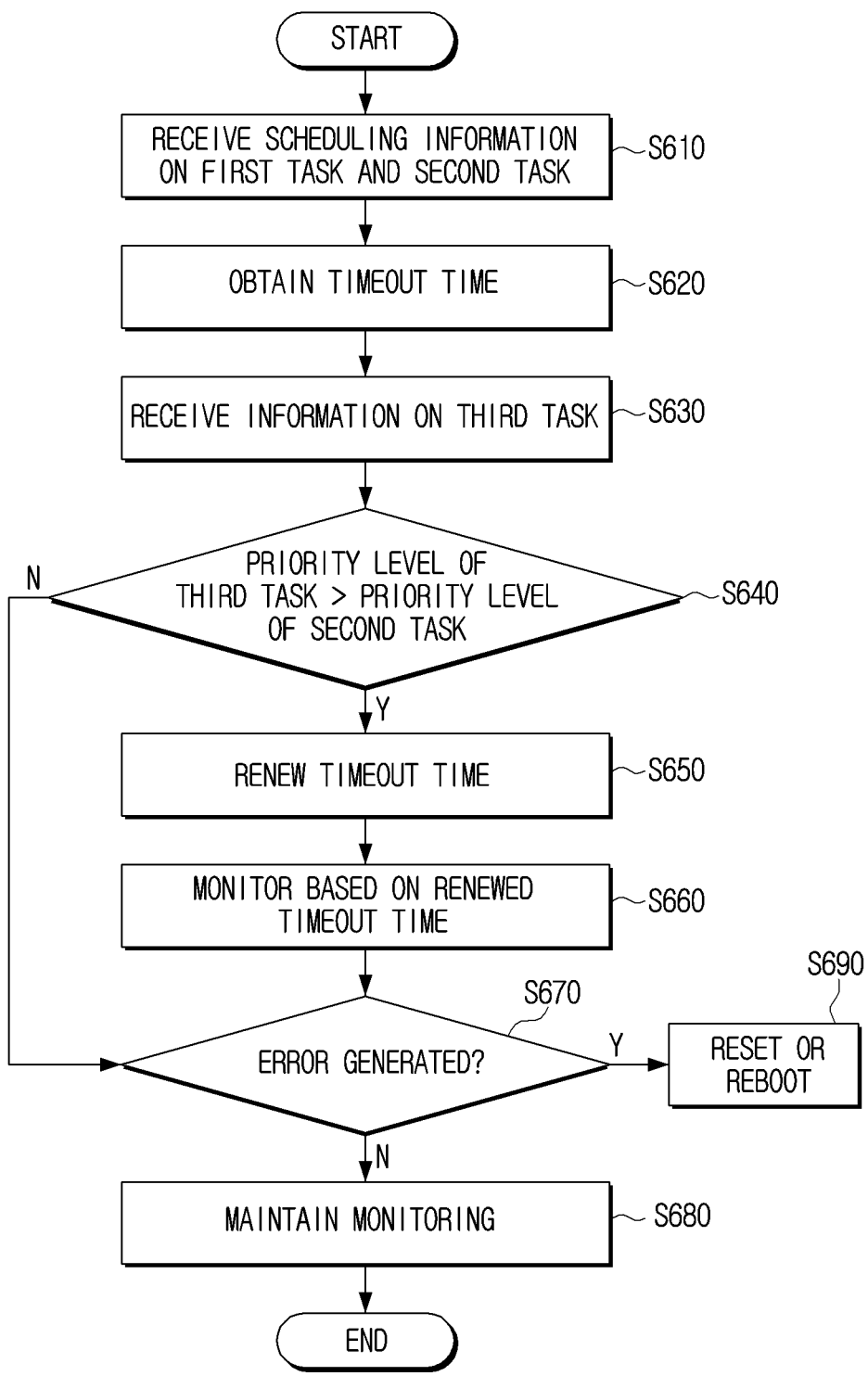
FIG. 6 is a diagram for describing an operation of an electronic device performing monitoring based on a timeout time according to an embodiment.

FIG. 6 is a diagram for describing an operation of an electronic device performing monitoring based on a timeout time according to an embodiment.

The electronic monitoring device 100 may receive scheduling information including the first task and the second task performed in the other electronic device 200 (S610). In addition, the electronic monitoring device 100 may access the scheduler of the other electronic device 200 to obtain the scheduling information.

In S620, the electronic monitoring device 100 may obtain a timeout time of one or more of the first task and the second task, such as, based on the obtained scheduling information. The electronic monitoring device 100 may be provided with a unique timeout time on the monitoring target task. The timeout time may refer to a time range in which the electronic device 100 is in a standby mode for receiving predetermined information (e.g., a predetermined signal) from the other electronic device 200. For example, based on the timeout time being a specific timeout time (e.g., 100 ms), the electronic monitoring device 100 may identify whether the predetermined information (e.g., predetermined signal) is received from the other electronic device 200 within the specific timeout time (e.g., 100 ms).

The electronic monitoring device 100 may then receive information on the third task (S630). The information of the third task may include at least one of information on a type of the third task or information on a priority level of the third task, and may be information not included in the scheduling information received from the other electronic device 200. In addition, the information on the third task may be information (e.g., a signal) corresponding to the third task. That is, the information on the third task may be predetermined information (e.g., a predetermined signal) to indicate whether the third task is normally in progress or has been completed.

Based on information on the third task not being received, the electronic device 100 may need (or be required) to identify whether the scheduled second task is delayed and to identify whether the third task is to be performed prior to the second task.

Accordingly, the electronic monitoring device 100 may compare the priority level of the second task with the priority level of the third task.

Based on the priority level of the third task being higher than the priority level of the second task (S640—Yes (Y)), the electronic device 100 may renew the timeout time T2 of the second task (S650). The renewed timeout time T2 of the second task may be a value obtained by adding the WCET of the third task to the previous timeout time T2 of the second task. In an embodiment, the renewed timeout time T2 of the second task may be a value obtained by adding the WCET of the third task to the WCET of the second task.

The electronic monitoring device 100 may then monitor whether information (e.g., a signal) corresponding to the second task is received based on the renewed timeout time (S660).

An error generation in the other electronic device 200 may be identified based on whether a signal corresponding to the second task is received within the renewed timeout time (S670). Based on information (e.g., a signal) corresponding to the second task being received within the renewed timeout time (S670-N), the electronic device 100 may identify as no error having been generated in the other electronic device 200 and may monitor whether information (e.g., a signal) corresponding to the scheduled task thereafter is received (S680).

Based on a signal corresponding to the second task not being received within the renewed timeout time (S670-Y), the electronic device 100 may identify as an error generated in the other electronic device 200 and may reset or reboot the other electronic device 200.

Based on the priority level of the third task being lower than the priority level of the second task (S640-N), whether an error has occurred in the other electronic device 200 may be determined by identifying whether information (e.g., a signal) corresponding to the second task is received and then identifying whether a signal corresponding to the third task is received (S670).

Figure 7:
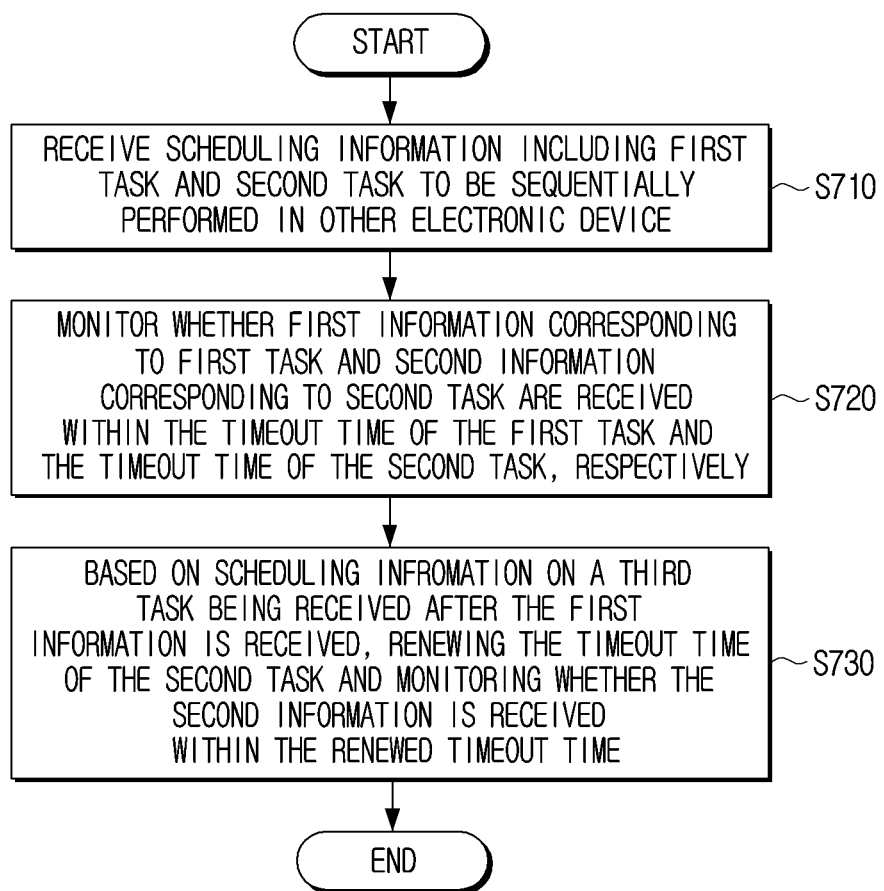
FIG. 7 is a flow chart for describing a control method of an electronic device according to an embodiment.

FIG. 7 is a flow chart for describing a control method of an electronic device according to an embodiment.

The electronic device 100 may receive scheduling information including the first task and the second task to be sequentially performed in the other electronic device 200 from the other electronic device 200 (S710).

The electronic device 100 may monitor whether first information (e.g., a signal) corresponding to the first task and second information corresponding to the second task are received within the timeout time of the first task and the timeout time of the second task, respectively. The timeout time of the first task and the timeout time of the second task may each be obtained based on the scheduling information (S720).

The electronic device 100 may renew the timeout time of the second task based on the priority level of the third task being higher than the priority level of the second task.

The electronic device 100 may identify the type of the third task based on information on the third task, obtain the WCET of the third task based on the identified type, and renew the timeout time of the second task based on the WCET of the third task. The information of the third task may include at least one of information on the type of the third task or information on the priority level of the third task, and may be information not included in the scheduling information received from the other electronic device 200.

The electronic device 100 may obtain the WCET according to the type of the third task.

The electronic device 100 may receive information on the third task from the other electronic device 200-2. The other electronic device 200-2 may be a device that receives and processes data obtained by the third task performed in the other electronic device 200-1 from the other electronic device 200-1.

The electronic device 100 may, based on receiving scheduling information on the third task after the first information corresponding to the first task is received from the other electronic device 200, renew the timeout time of the second task and monitor whether the second information (e.g., a second signal) corresponding to the second task is received within the renewed timeout time (S730).

The electronic device 100 may, based on receiving information on the third task, add a fourth task of the other electronic device that receives and processes data obtained by the third task to the scheduling information of the other electronic device. The fourth task may be a task of processing data received by the other electronic device.

The above-described electronic device may be a device that includes a module performing the watchdog function.

The detailed operations of each step have been described above and thus a detailed description thereof may not be repeated here.

Methods according to the various embodiments described above may be realized in an application form capable of being installed in conventional electronic devices.

In addition, methods according to the various embodiments described above may be implemented as a software upgrade to conventional electronic devices, or just as a hardware upgrade.

In addition, the various embodiments described above may be performed through an embedded server equipped in an electronic device or an external server of at least one from the electronic devices.

According to an embodiment, the various embodiments described above may be implemented with software including instructions stored in a machine-readable storage media (example: a computer). The machine may, as a device capable of calling the stored instructions from the storage media and operating according to the called instructions, include electronic devices according to the disclosed embodiments. Based on instructions being executed by the processor, the processor may directly, or using other elements under the control of the processor may perform functions corresponding to the instructions. The instructions may include a code generated by a compiler or a code executable by an interpreter. The machine-readable storage media may be provided in the form of a non-transitory storage medium, where the 'non-transitory' storage medium is tangible and does not include a signal. This term does not distinguish that data is permanently or temporarily stored in the storage medium.

In addition, according to an embodiment, the method according to the various embodiments described above may be provided in a computer program product. A computer program product may be exchanged between a seller and a purchaser as a commodity. A computer program product may be distributed in the form of a machine-readable storage medium (example: compact disc read only memory (CD-ROM)) or distributed online through an application store (example: PlayStore™). In the case of online distribution, at least a portion of the computer program product may be at least stored temporarily or generated temporarily in a storage medium such as a manufacturer's server, a server of an application store, or a memory of a relay server.

In addition, according to an embodiment, the various embodiments described above may be implemented in a computer or a similar device within a machine-readable storage medium using a software, a hardware, or a combination thereof. In some cases, the embodiments described herein may be implemented by the processor itself. According to a software implementation, the embodiments such as the procedures and functions described herein may be implemented with separate software modules. Each of the software modules may perform one or more of the functions and operations described herein The computer instructions for performing machine processing operations according to the various embodiments described above may be stored in a non-transitory computer-readable medium. The computer instructions stored in this non-transitory computer-readable medium may cause a specific device to perform the processing operations of a device according to the various embodiments described above when executed by the processor of a specific device The non-transitory computer readable medium may refer to a medium that stores data semi-permanently rather than storing data for a very short time, such as a register, a cache, a memory or the like, and may be readable by an apparatus. Specific examples of the non-transitory computer readable medium may include a compact disc (CD), a digital versatile disc (DVD), a hard disc, a Blu-ray disc, a USB, a memory card, a ROM, and the like.

In addition, each of the elements (example: a module or a program) according to the various embodiments described above may be composed of a single entity or a plurality of entities, and some sub-elements of the abovementioned sub-elements may be omitted or other sub-elements may be further included in various embodiments. Alternatively or additionally, some elements (example: modules or programs) may be integrated into one entity to perform the same or similar functions performed by each respective element prior to integration. Operations performed by a module, program, or other element, in accordance with various embodiments, may be performed sequentially, in parallel, repetitively, or heuristically, or at least some operations may be performed in a different order, omitted, or another operation may be added.

According to the various embodiments described above, an operation of unnecessarily resetting or rebooting a device (module) to be monitored that is in simple delay considering real-time scheduling may be prevented.

Accordingly, problems incurred by the device (module) to be monitored being reset or rebooted and suspending an operation in progress may be solved.

While various embodiments have been illustrated and described, the present disclosure is not limited to the specific embodiments described. It will be understood by those skilled in the art that various changes in form and details may be made therein without departing from the spirit and scope of the disclosure.

What is claimed is:

1. An electronic device comprising:
a communication interface; and
a processor configured to:
obtain scheduling information comprising a first task and a second task that are to be sequentially performed in a first electronic device from the first electronic device through the communication interface,
obtain, based on the scheduling information, a timeout time of the first task and a timeout time of the second task, and
monitor whether first information corresponding to the first task and second information corresponding to the second task are obtained within the timeout time of the first task and the timeout time of the second task, respectively,
wherein the processor is further configured to, based on obtaining scheduling information on a third task after obtaining the first information corresponding to the first task from the first electronic device, renew the timeout time of the second task and monitor whether the second information corresponding to the second task is obtained within the renewed timeout time.

2. The electronic device of claim 1, wherein the processor is further configured to renew the timeout time of the second task based on a priority level of the third task being higher than a priority level of the second task.

3. The electronic device of claim 1, wherein the processor is further configured to identify a type of the third task based on the scheduling information on the third task, obtain a worst case execution time (WCET) of the third task based on the identified type, and extend the timeout time of the second task based on the WCET of the third task.

4. The electronic device of claim 3, wherein the extended timeout time of the second task is obtained by adding the WCET of the second task to the WCET of the third task.

5. The electronic device of claim 1, wherein the processor is further configured to obtain the scheduling information on the third task from a second electronic device,
wherein the second electronic device is configured to obtain and process data obtained by the third task performed in the first electronic device.

6. The electronic device of claim 5, wherein the processor is further configured to add a fourth task of the second electronic device of obtaining and processing the data obtained by the third task based on the scheduling information on the third task being obtained, and
wherein the fourth task processes the data obtained from the second electronic device.

7. The electronic device of claim 1, wherein the scheduling information on the third task comprises at least one of information on a type of the third task or information on a priority level of the third task.

8. The electronic device of claim 1, further comprising a watchdog module.

9. An electronic system comprising:
a first electronic device; and
a second electronic device,
wherein the first electronic device is configured to transmit scheduling information on an operation performed in the first electronic device to the second electronic device,
wherein the second electronic device is configured to:
obtain the scheduling information transmitted from the first electronic device, the scheduling information comprising a first task and a second task that are to be sequentially performed in the first electronic device,
obtain, based on the scheduling information, a timeout time of the first task and a timeout time of the second task, and
monitor whether first information corresponding to the first task and second information corresponding to the second task are obtained within the obtained timeout time of the first task and the obtained timeout time of the second task, respectively, and
wherein the second electronic device is further configured to, based on obtaining scheduling information on a third task after obtaining the first information corresponding to the first task from the first electronic device, renew a timeout time of the second task and monitor whether the second information corresponding to the second task is obtained within the renewed timeout time.

10. The electronic system of claim 9, further comprising:
a third electronic device configured to obtain and process data obtained by the third task from the first electronic device,
wherein the second electronic device adds a fourth task of the third electronic device to the scheduling information of the third electronic device based on the obtaining of the scheduling information on the third task, and
wherein the fourth task processes data obtained by the first electronic device from the third electronic device.

11. The electronic system of claim 9, wherein the second electronic device is configured to renew the timeout time of the second task based on a priority level of the third task being higher than a priority level of the second task.

12. A method of controlling an electronic device, the method comprising:
obtaining scheduling information comprising a first task and a second task that are to be sequentially performed in a first electronic device from the first electronic device;
obtaining, based on the scheduling information, a timeout time of the first task and a timeout time of the second task; and
monitoring whether first information corresponding to the first task and second information corresponding to the second task are obtained within the timeout time of the first task and the timeout time of the second task, respectively,
wherein the monitoring further comprises, based on scheduling information on a third task being obtained after obtaining the first information corresponding to the first task from the first electronic device, renewing the timeout time of the second task and monitoring whether the second information corresponding to the second task is obtained within the renewed timeout time.

13. The method of claim 12, wherein the monitoring further comprises renewing the timeout time of the second task based on a priority level of the third task being higher than a priority level of the second task.

14. The method of claim 12, wherein the monitoring further comprises:
identifying a type of the third task based on the scheduling information on the third task;
obtaining a worst case execution time (WCET) of the third task based on the identified type; and
extending the timeout time of the second task based on the WCET of the third task.

15. The method of claim 14, wherein the extended timeout time of the second task is obtained by adding of the WCET of the second task or the timeout time of the second task to the WCET of the third task.

16. The method of claim 12, wherein the monitoring further comprises obtaining the scheduling information on the third task from a second electronic device, and wherein the second electronic device is configured to obtain and process data obtained by the third task performed in the first electronic device from the first electronic device.

17. The method of claim 16, further comprising:
adding a fourth task of the second electronic device obtaining and processing the data obtained by the third task based on the scheduling information on the third task being obtained to scheduling information of the second electronic device,
wherein the fourth task processes the data obtained from the second electronic device.

18. The method of claim 12, wherein the scheduling information on the third task comprises at least one of information on a type of the third task or information on a priority level of the third task.

19. The method of claim 12, wherein the electronic device comprises a watchdog module.

* * * * *